Feb. 16, 1937.  D. E. GAMBLE  2,070,892
METHOD OF MAKING WEIGHTS FOR CENTRIFUGAL CLUTCHES
Filed July 27, 1933
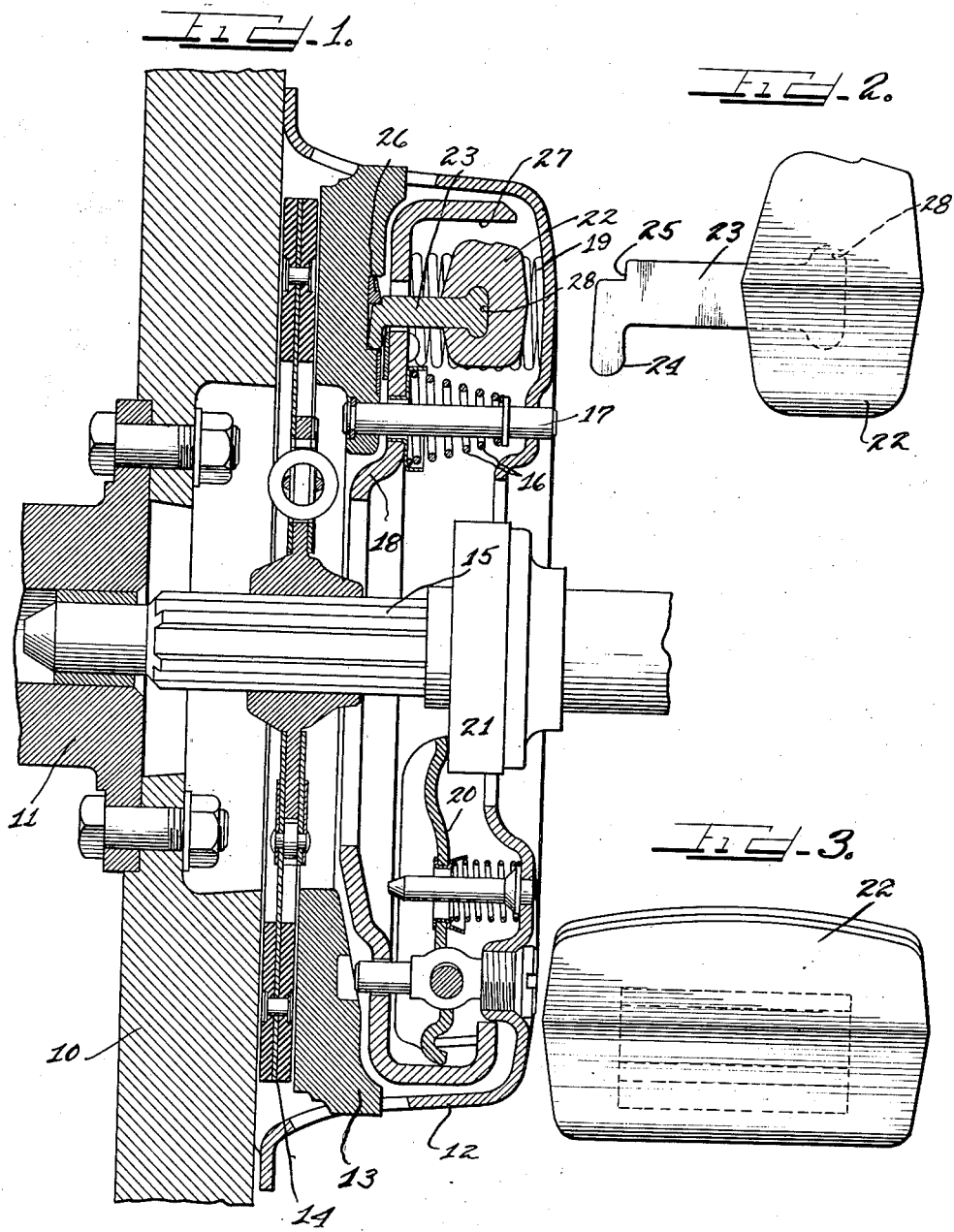
Inventor
David E. Gamble.
by Charles Hill
Attys Patented Feb. 16, 1937

2,070,892

UNITED STATES PATENT OFFICE 2,070,892

METHOD OF MAKING WEIGHTS FOR CENTRIFUGAL CLUTCHES

David E. Gamble, Chicago, Ill., assignor, by mesne assignments, to Borg-Warner Corporation, Chicago, Ill., a corporation of Illinois Application July 27, 1933, Serial No. 682,375

2 Claims. (Cl. 29—152)

This invention relates to automatic clutches of the centrifugally energized type which engage above a predetermined rotative speed, and has special reference to the provision of an improved method of making centrifugally energized weights for use in such clutches. Automatic clutches of the general type chosen for illustration have been disclosed and claimed in the prior application of Harold Nutt, Serial No. 672,820 filed May 25, 1933, and the present invention relates to improved weights for use in such a clutch, so that reference may be made to said Nutt application for a more detailed description of the clutch per se.

It is an object of this invention to provide a method of making a compact and accurately balanced weight having hardened surfaces to take the wear and heavy metal in the portions where concentrated weight is desirable to secure a powerful centrifugal action without excessive bulk. To this end the preferred embodiment of this invention utilizes a forged, rolled or drawn steel section forming the contact or pivot members, the steel section being hardened to resist wear and having a weight member die cast thereon, preferably of a dense material such as a lead alloy, although cast iron may also be used in some cases. The resulting built-up weight provides hardened wearing parts with the weight portion concentrated at the end of the lever arm so that the total weight required to produce a given force may be less than would be the case if the entire weight were to be produced from a material having sufficient resistance to withstand the wear at the pivot or fulcrum points.

It is a further object of this invention to effect the manufacture of accurately balanced weights with the elimination of expensive machining operations by providing a pre-formed shank member about which the weight proper is cast to accurate size and shape, rendering the assemblies statically and dynamically uniform whereby a series of weights when assembled in a clutch will be in running balance whether retracted or energized by centrifugal force.

Other and further important objects of this invention will become apparent from the following description and appended claims.

This invention (in a preferred form) is illustrated in the drawing and hereinafter more fully described.

On the drawing:

Figure 1 is a longitudinal section through an automatic clutch containing centrifugally responsive weights embodying the features of this invention.

Figure 2 is an enlarged side view of one of the weights.

Figure 3 is enlarged end view of one of the weights.

As shown on the drawing:

The clutch chosen to illustrate this invention corresponds closely to that claimed in the co-pending Harold Nutt application previously mentioned, to which application reference may be made for a fuller description of the clutch, per se. For the present purpose a brief description of the clutch will be sufficient to bring out the functional features of the weights of this invention.

The illustrated clutch is of the automotive type where an engine flywheel 10 mounted on the end of the engine crankshaft 11 carries a clutch housing 12 within which is a pressure plate 13 adapted when shifted to the left to engage a clutch driven disc 14 against the face of the flywheel; the driven disc being mounted on a shaft 15. The pressure plate is normally held in its retracted position by a number of retractor springs 16 acting between studs 17 and a spring mounting ring 18 which latter is backed by preloaded pressure springs 19, the total load of which determines the maximum clutch engaging pressure. The spring mounting ring is normally located by throwout levers 20 the inner ends of which bear against a throwout bearing 21 under the usual clutch pedal control. By retracting this bearing to the right the clutch can be manually engaged when the centrifugal control is inoperative, and when said centrifugal control is energized due to attainment of a predetermined rotative speed the clutch can be manually disengaged by shifting the throwout bearing to the left to retract the spring mounting ring and the pressure plate from engagement with the driven disc.

The centrifugal control comprises weights 22 on shanks or arms 23 having a toe 24 engaging under the spring mounting ring and heels 25 fulcruming against hardened inserts 26 on the pressure plate. The arrangement is such that when the weights swing out into contact with the peripheral flange 27 on the spring mounting ring the heel and toe of the lever act to pry the pressure plate away from the spring mounting ring into contact with the driven disc. After running clearances have been taken up the final portion of the outward swing of the weights acts to shift the spring mounting ring to the right, transferring the pressure spring load to the pressure plate, at the same time slightly withdrawing the throwout fingers from the throwout bearing.

Since the heel and toe of each weight arm are the only parts subject to wear, it is desirable to make these parts of a material that has natural resistance to wear or can be hardened after shaping. As an example the arm, toe and heel, as well as a head or enlargement 28 to anchor the weight, can be drawn or rolled in strips in the desired final form and then cut off in proper sizes, being subsequently hardened. The weights may then be applied as die castings of a heavier metal preferably such as a lead alloy, the weights being cast about the enlarged heads on the arms and thus being securely anchored in place. With such a built up weight structure the arm, heel and toe can be made of minimum weight as they add little leverage responsive to centrifugal forces, while the weight proper can be concentrated at the maximum distance from the fulcrum point to render the mass as a whole more responsive and more powerful for the same total weight. This is an important consideration since the weights must be closely matched, and as light as possible in order to provide a clutch structure without undue rotating mass liable to unbalance should one or more weights operate in advance of the others.

With this arrangement the insert or steel arm section of the weight can be made of any analysis desired and can be hardened before the weight is die-cast thereon. For die-casting I prefer pressure casting in accurate molds to assure uniformity, but in some cases it might be desirable to use a cast iron weight. The steel section is preferably drawn or rolled to the proper cross-section and cut into lengths, although forgings can be utilized in spite of the extra cost of machining to obtain sufficient accuracy.

It will thus be seen that I have invented an improved composite weight for use in automotive clutches where a plurality of independent weights must respond in synchronism to a predetermined rotative speed.

I am aware that many changes may be made and numerous details of construction may be varied through a wide range without departing from the principles of this invention and I, therefore, do not purpose limiting the patent granted hereon otherwise than necessitated by the prior art.

I claim as my invention:

1. The method of forming composite weights responsive to centrifugal forces, comprising cutting off sections of drawn steel shaped to provide the desired fulcrum surfaces along one margin and an anchor along the other margin, hardening the sections so formed, and die-casting a weight about the anchor on said hardened steel section.

2. The method of forming composite weights responsive to centrifugal forces, comprising cutting off sections of drawn steel shaped to provide the desired fulcrum surfaces along one margin and an anchor along the other margin, hardening the sections so formed, and die-casting a heavy metal weight about the anchor on said hardened steel section.

DAVID E. GAMBLE.